(12) United States Patent
Meng et al.

(10) Patent No.: US 12,447,854 B2
(45) Date of Patent: Oct. 21, 2025

(54) TOPOLOGY STRUCTURE OF POWER BATTERY PACK FOR DIESEL-ELECTRIC HYBRID LOCOMOTIVE

(71) Applicant: CRRC ZIYANG CO., LTD., Sichuan (CN)

(72) Inventors: Yufa Meng, Sichuan (CN); Pinghua Wang, Sichuan (CN); Ruilin Chang, Sichuan (CN); Shunguo Liu, Sichuan (CN); Xiao Han, Sichuan (CN)

(73) Assignee: CRRC ZIYANG CO., LTD., Sichuan (CN)

( * ) Notice: Subject to any disclaimer, the term of this patent is extended or adjusted under 35 U.S.C. 154(b) by 962 days.

(21) Appl. No.: 17/597,379

(22) PCT Filed: Jun. 23, 2020

(86) PCT No.: PCT/CN2020/097630
§ 371 (c)(1),
(2) Date: Jan. 4, 2022

(87) PCT Pub. No.: WO2021/004267
PCT Pub. Date: Jan. 14, 2021

(65) Prior Publication Data
US 2022/0250503 A1    Aug. 11, 2022

(30) Foreign Application Priority Data

Jul. 5, 2019    (CN) .......................... 201910605264.2

(51) Int. Cl.
*H02J 7/00*    (2006.01)
*B60L 53/24*    (2019.01)
(Continued)

(52) U.S. Cl.
CPC .............. *B60L 58/10* (2019.02); *B60L 53/24* (2019.02); *B61C 7/04* (2013.01); *H02J 7/0014* (2013.01);
(Continued)

(58) Field of Classification Search
CPC ........ B60L 58/10; B60L 58/24; H02J 7/0014; H02J 7/0031; H02J 2207/20
(Continued)

(56) References Cited

U.S. PATENT DOCUMENTS 6,486,568 B1 * 11/2002 King ....................... B60L 50/61
                                                         307/66
9,219,366 B2 * 12/2015 Kim .......................... H02J 7/00
(Continued)

FOREIGN PATENT DOCUMENTS

CN    102324876 A    1/2012
CN    104467455 A    3/2015
(Continued)

*Primary Examiner* — Alexis B Pacheco
(74) *Attorney, Agent, or Firm* — NKL Law; Allen Xue

(57) ABSTRACT

A topology structure of a power battery pack for a diesel-electric hybrid locomotive includes a plurality of components. A chopper unit is connected in parallel to a support capacitor, an AC/DC module, a DC/AC module, a reactor unit and a power battery system. The power battery system includes several groups of power modules. The power module includes a contactor unit, a current sensor, a fuse, a power battery, and a voltage sensor. The contactor unit, the current sensor and the power battery are connected in series. Two ends of the voltage sensor are respectively disposed at two ends of the power battery. A locomotive microcomputer is connected to a DUC controller and a power battery management system. The DUC controller is connected to the
(Continued)

DC/AC module, the chopper unit and the contactor unit. The power battery management system is connected to the contactor unit.

7 Claims, 3 Drawing Sheets

(51) Int. Cl.
  *B60L 58/10* (2019.01)
  *B61C 7/04* (2006.01)
  *H02J 7/14* (2006.01)
(52) U.S. Cl.
  CPC ......... *H02J 7/0031* (2013.01); *B60L 2200/26* (2013.01); *H02J 2207/20* (2020.01)
(58) Field of Classification Search
  USPC .......................................................... 320/132
  See application file for complete search history.

(56) References Cited

U.S. PATENT DOCUMENTS

| | | | | |
|---|---|---|---|---|
| 2002/0174796 | A1* | 11/2002 | Kumar | B60L 15/2045 105/26.05 |
| 2004/0061503 | A1* | 4/2004 | Morimoto | G01R 31/3278 903/907 |
| 2005/0024001 | A1* | 2/2005 | Donnelly | B60L 3/102 318/66 |
| 2005/0045058 | A1* | 3/2005 | Donnelly | B60L 58/19 105/26.05 |
| 2010/0244847 | A1* | 9/2010 | Kudo | G01R 31/3842 324/433 |
| 2011/0298424 | A1* | 12/2011 | Yamauchi | B60L 58/12 320/118 |
| 2013/0106356 | A1* | 5/2013 | Nakao | H01M 10/48 320/118 |
| 2013/0113290 | A1* | 5/2013 | Sato | H02J 7/0013 307/80 |
| 2014/0055094 | A1* | 2/2014 | Takagi | H02J 7/342 320/126 |
| 2014/0300180 | A1* | 10/2014 | Iwashita | B60L 3/04 307/10.1 |
| 2015/0028817 | A1* | 1/2015 | Brockerhoff | H02J 7/0013 429/61 |
| 2018/0254732 | A1* | 9/2018 | Smolenaers | H02J 1/12 |
| 2019/0198945 | A1* | 6/2019 | Machida | H02J 7/0016 |
| 2020/0164755 | A1* | 5/2020 | Smolenaers | B60L 53/53 |
| 2020/0298722 | A1* | 9/2020 | Smolenaers | H02J 7/345 |
| 2021/0078429 | A1* | 3/2021 | Li | B60L 58/21 |
| 2022/0402390 | A1* | 12/2022 | Smolenaers | H02J 3/322 |

FOREIGN PATENT DOCUMENTS

| | | |
|---|---|---|
| CN | 105235546 A | 1/2016 |
| CN | 107733055 A | 2/2018 |
| CN | 110254294 A | 9/2019 |
| JP | 2010057236 A | 3/2010 |

\* cited by examiner

TOPOLOGY STRUCTURE OF POWER BATTERY PACK FOR DIESEL-ELECTRIC HYBRID LOCOMOTIVE

FIELD OF THE INVENTION

The present invention belongs to the field of rolling stock rail transit, and relates to a topology structure of a power battery pack for diesel-electric hybrid locomotive.

BACKGROUND OF THE INVENTION

At present, power battery packs for domestic and foreign diesel-electric hybrid locomotives have a topology structure shown in FIG. 1, in which a power battery system is divided into two or more packs for parallel connection according to energy size. Such topology structure has disadvantages of control difficulty when a plurality of power battery packs are put into operation and ease to result in impact of high return current between the power battery packs, which seriously damage a fuse in a main circuit, and causes a contactor contact to suffer from isolation, burr or damage.

SUMMARY OF THE INVENTION

The object of the present invention is to overcome shortcomings of the prior art and provide a topology structure of a power battery pack for an diesel-electric hybrid locomotive. The object of the present invention is realized by the following technical solution:

A topology structure of a power battery pack for a diesel-electric hybrid locomotive, comprising an AC/DC module, a DC/AC module, a power supply, a Digital Upconverter (DUC) controller, a locomotive microcomputer, a power battery management system and an intermediate processing unit, wherein the intermediate processing unit comprises a chopper unit, a reactor unit and a power battery system; the chopper unit is connected in parallel to a support capacitor C, and the chopper unit is also connected to the AC/DC module, the DC/AC module, the reactor unit and the power battery system; the power battery system comprises several groups of power modules; the power module comprises a contactor unit, a current sensor, a fuse, a power battery, and a voltage sensor; the contactor unit, the current sensor and the power battery are connected in series, the fuse is disposed on a series circuit composed of the contactor unit, the current sensor and the power battery, and both ends of the voltage sensor are respectively disposed at both ends of the power battery;

a locomotive microcomputer is connected to a DUC controller and a power battery management system respectively; the DUC controller is connected to the DC/AC module, the chopper unit and the contactor unit; and the power battery management system is connected to the contactor unit.

As a preferred mode, the power supply comprises a diesel generator set and a ground AC power supply; the diesel generator set is connected to the AC/DC module through a switch 1; and the ground AC power supply is connected to the AC/DC module through a switch 2.

As a preferred mode, the topology structure also comprises a driver controller which is connected to the locomotive microcomputer.

As a preferred mode,
the power modules comprise n groups;
the chopper unit comprises n chopper subunits; each chopper subunit is correspondingly connected to one power module;
the power battery management system comprises 1BMU, 2BMU . . . nBMU; the contactor unit comprises a first contactor unit and a second contactor unit;
the first contactor unit comprises contactors 11KMDC, 21KMDC . . . n1KMDC; the second contactor unit comprises contactors 12KMDC, 22KMDC . . . n2KMDC;
n is a positive integer greater than 1;
the 1BMU connects the 11KMDC and 12KMDC, the 2BMU connects the 21KMDC and 22KMDC . . . the nBMU connects the n1KMDC and n2KMDC.

As a preferred mode, the reactor unit comprises n filter reactors which are respectively connected to 11KMDC, 21KMDC . . . n1KMDC.

As a preferred mode, the power module is provided with two current sensors, a first current sensor is respectively connected to the chopper subunit and the filter reactor, the filter reactor is connected to one end of one contactor, and the other end of the contactor is connected to a second current sensor; the second current sensor is connected to a first fuse, the first fuse is connected to the power battery, the power battery is connected to a second fuse, and the second fuse is connected to another contactor; and for each power module, an outgoing line between the second current sensor and the contactor is connected to a positive pole of a diode, a negative pole of the diode is connected to a resistor R, the resistor R is connected to the contactor KMDC1, and the contactor KMDC1 is connected to a common node of the contactor 11KMDC and the filter reactors.

As a preferred mode, the chopper subunit is a chopper module or chopper bridge arm.

As a preferred mode, the chopper module comprises a first IGBT tube and a second IGBT tube in series, the first IGBT tube is connected in parallel to a first diode, and the second IGBT tube is connected in parallel to a second diode.

As a preferred mode, a maintenance disconnector is provided, and the maintenance disconnector is connected to the power module.

As a preferred mode, the maintenance disconnector comprises a first switch and a second switch, and the first switch and the second switch are respectively disposed at both ends of the power module. The present invention has the following beneficial effects: provision of the chopper unit and the reactor unit with low equipment cost is enough to solve control difficulty when a plurality of power battery packs are put into operation, completely avoids impact of high return current between the power battery packs which, in serious cases, damages the fuse in the main circuit and causes contactor contacts to suffer from isolation, burr or damage, ensures operating reliability of the power battery system and effectively extends service life of the power batteries.

DETAILED DESCRIPTION OF THE INVENTION

The technical solution of the present invention is described in detail in combination with drawings, but the protection scope of the present invention is not limited to the following description.

Figure 1:
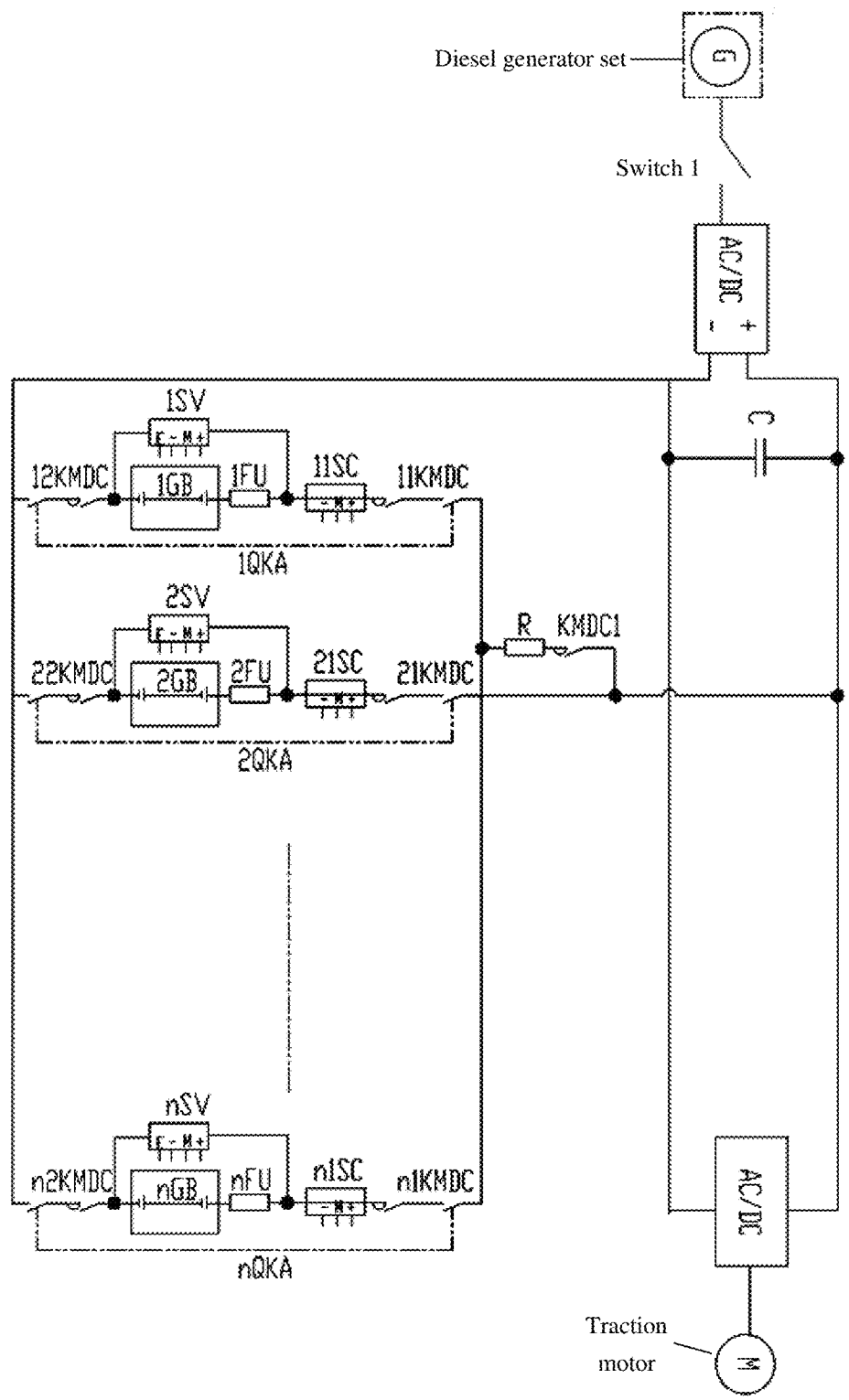
FIG. 1 shows a topology structure of power batteries for domestic and foreign diesel-electric hybrid locomotives.
Figure 2:
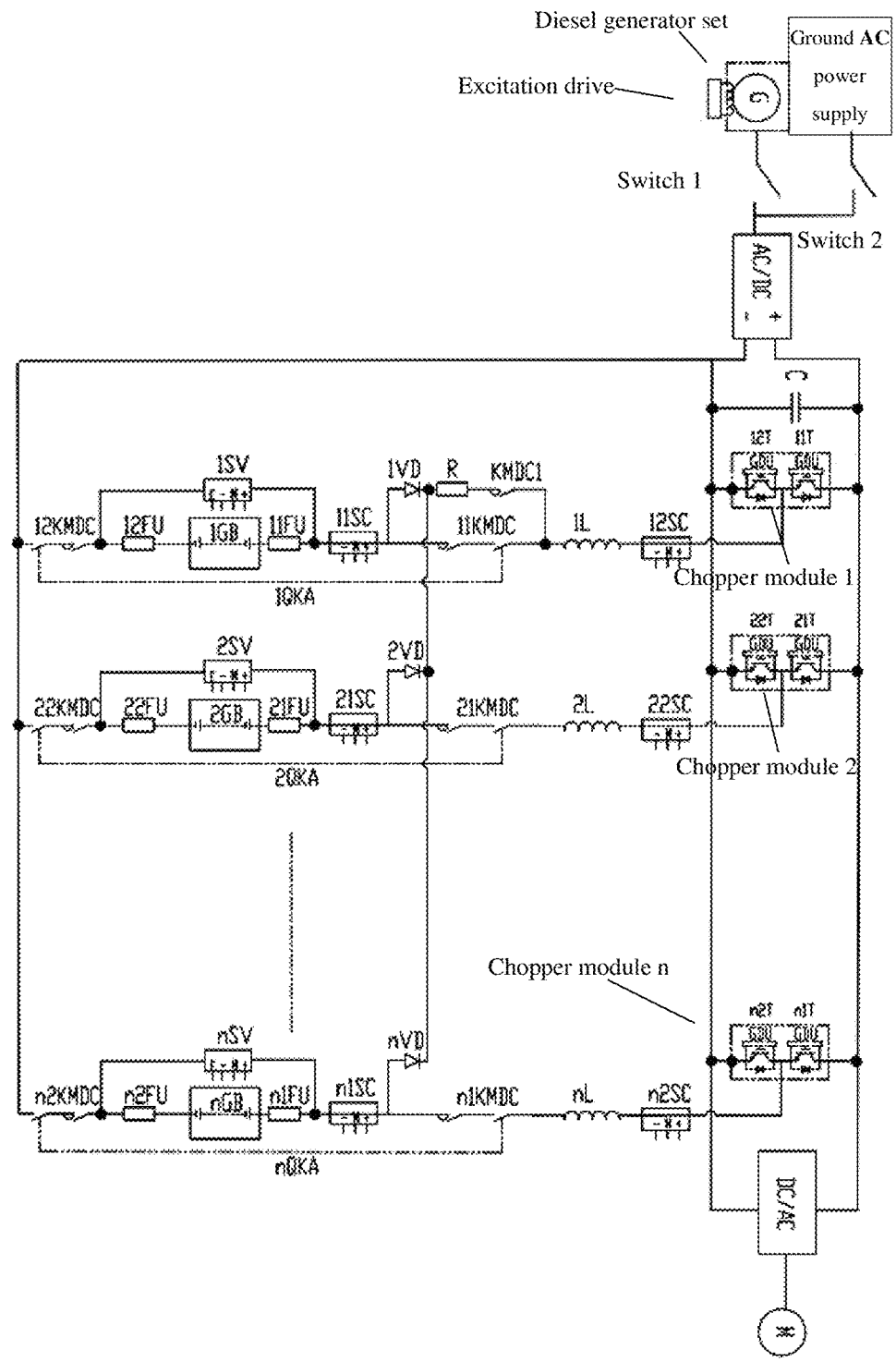
FIG. 2 shows the topology structure of the present invention.
Figure 3:
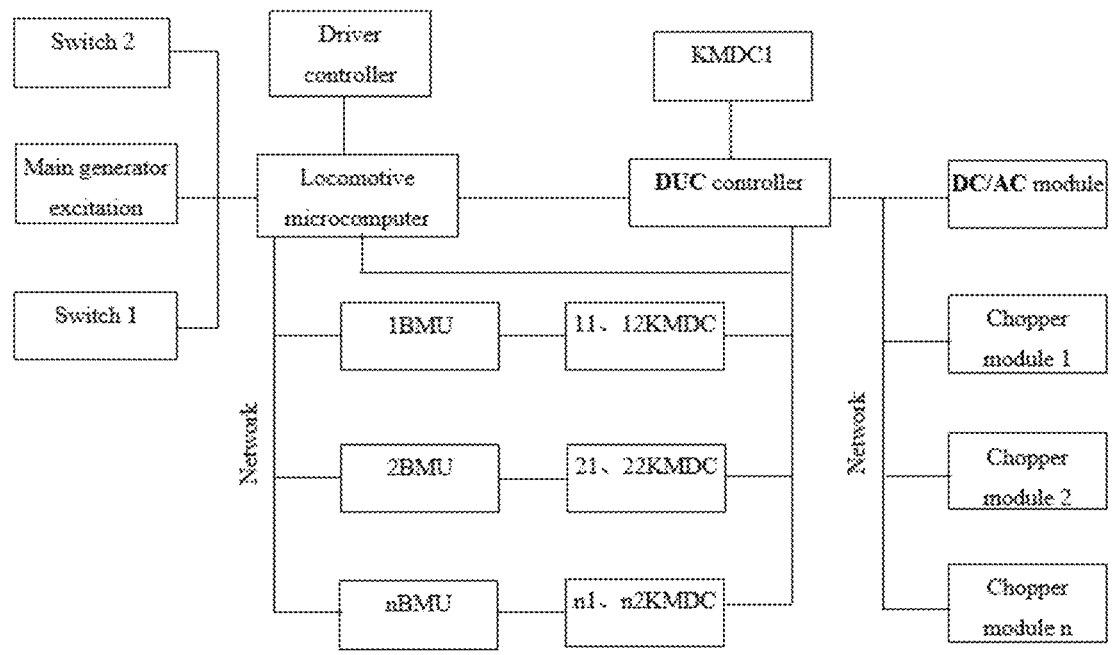
FIG. 3 shows a schematic diagram of the control principle of the present invention.

As shown in FIG. 2 and FIG. 3, a topology structure (or device) of a power battery pack for a diesel-electric hybrid locomotive, comprises an AC/DC module, a DC/AC module, a power supply, a DUC controller, a locomotive microcomputer, a power battery management system and an intermediate processing unit; wherein the intermediate processing unit comprises a chopper unit, a reactor unit and a power battery system; the chopper unit is connected in parallel to a support capacitor C, and the chopper unit is also connected to the AC/DC module, the DC/AC module, the reactor unit and the power battery system;

the power battery system comprises several groups of power modules (or branches); the power module comprises a contactor unit, a current sensor, a fuse, a power battery, and a voltage sensor; the contactor unit, the current sensor and the power battery are connected in series, the fuse is disposed on a series circuit composed of the contactor unit, the current sensor and the power battery, and both ends of the voltage sensor are respectively disposed at both ends of the power battery;

a locomotive microcomputer is connected to a DUC controller and a power battery management system respectively; the DUC controller is connected to the DC/AC module, the chopper unit and the contactor unit; and the power battery management system is connected to the contactor unit.

In one preferred embodiment, the power supply comprises a diesel generator set and a ground AC power supply; the diesel generator set is connected to the AC/DC module through a switch 1; and the ground AC power supply is connected to the AC/DC module through a switch 2. The diesel generator set uses excitation drive.

In one preferred embodiment, the topology structure also comprises a driver controller which is connected to the locomotive microcomputer.

In one preferred embodiment, the power modules comprise n groups;

the chopper unit comprises n chopper subunits; each chopper subunit is correspondingly connected to one power module;

the power battery management system comprises 1BMU, 2BMU . . . nBMU; the contactor unit comprises a first contactor unit and a second contactor unit;

the first contactor unit comprises contactors 11KMDC, 21KMDC . . . n1KMDC; the second contactor unit comprises contactors 12KMDC, 22KMDC . . . n2KMDC;

n is a positive integer greater than 1;

the 1BMU connects the 11KMDC and 12KMDC, the 2BMU connects the 21KMDC and 22KMDC . . . the nBMU connects the n1KMDC and n2KMDC.

In one preferred embodiment, the reactor unit comprises n filter reactors (inductors) which are respectively connected to 11KMDC, 21KMDC . . . n1KMDC.

In one preferred embodiment, the power module is provided with two current sensors, a first current sensor is respectively connected to the chopper subunit and the filter reactor, the filter reactor is connected to one end of one contactor, and the other end of the contactor is connected to a second current sensor; the second current sensor is connected to a first fuse, the first fuse is connected to the power battery, the power battery is connected to a second fuse, and the second fuse is connected to another contactor;

and for each power module, an outgoing line between the second current sensor and the contactor is connected to a positive pole of a diode (e.g., 1VD or 2VD or nVD in FIG. 2), a negative pole of the diode is connected to a resistor R, the resistor R is connected to the contactor KMDC1, and the contactor KMDC1 is connected to a common node of the contactor 11KMDC and the filter reactors. In one preferred embodiment, the chopper subunit is a chopper module or chopper bridge arm.

In one preferred embodiment, the chopper module comprises a first IGBT tube and a second IGBT tube in series, the first IGBT tube is connected in parallel to a first diode, and the second IGBT tube is connected in parallel to a second diode. Preferably, as shown in FIG. 2, the first IGBT tube is connected to a GDU, and the second IGBT tube is connected to the GDU.

In one preferred embodiment, a maintenance disconnector is provided, and the maintenance disconnector is connected to the power module.

In one preferred embodiment, the maintenance disconnector comprises a first switch and a second switch, and the first switch and the second switch are respectively disposed at both ends of the power module.

The technical solution consists of the topology structure of a power battery pack as shown in FIG. 2 and the control principle as shown in FIG. 3: first, diesel generator set, switch 1, ground AC power supply and switch 2; second, the converter module AC/DC, support capacitor C, chopper module 1, chopper module 2 to chopper module n, converter module DC/AC and traction motor; third, the diodes 1VD, 2VD to nVD of each battery pack connected in parallel with the precharge circuit resistor R and the contactor KMDC1; fourth, the power battery pack 1 circuit current sensor 12SC, filter reactor 1L, maintenance disconnector 1QKA, battery pack positive circuit contactor 11KMDC, current sensor 11SC, power battery pack total positive terminal fuse 11FU, power battery pack 1GB, power battery pack total negative terminal fuse 12FU, battery pack negative circuit contactor 12KMDC and voltage sensor 1SV; fifth, the power battery pack 2 circuit current sensor 22SC, filter reactor 2L, maintenance disconnector 2QKA, battery pack positive circuit contactor 21KMDC, current sensor 21SC, power battery pack total positive terminal fuse 21FU, power battery pack 2GB, power battery pack total negative terminal fuse 22FU, battery pack negative circuit contactor 22KMDC and voltage sensor 2SV; sixth, the power battery pack n circuit current sensor n2SC, filter reactor nL, maintenance disconnector nQKA, battery pack positive circuit contactor n1KMDC, current sensor n1SC, power battery pack total positive terminal fuse n1FU, power battery pack nGB, power battery pack total negative terminal fuse n2FU, battery pack negative circuit contactor n2KMDC and voltage sensor nSV; and seventh, the main generator excitation module, locomotive microcomputer, power battery management system 1BMU, 2BMU to nBMU, DUC controller and driver controller.

Operating Principle:

Operation control of the power battery pack: When the power battery pack needs to be put into operation, the power battery management systems 1BMU, 2BMU to nBMU transmit parameters of the power battery pack voltage sensors 1SV, 2SV to NSV and battery pack position 1GB or 2GB or nGB with the highest voltage to the DUC controller or the locomotive microcomputer through a communication network system. The DUC controller or the locomotive microcomputer first controls making of the precharge contactor KMDC1. At this time, the power battery pack 1GB or 2GB or nGB with the highest voltage discharges to charge the support capacitor C of the intermediate DC link of the converter. When the voltage of the intermediate DC link rises to a set threshold value for the battery voltage of the battery pack with the highest voltage, the DUC controller or the locomotive microcomputer controls making of the highest-voltage battery pack 1GB or 2GB or nGB circuit contactors 11KMDC and 12KMDC or 21KMDC and 22KMDC or n1KMDC and n2KMDC, so that the battery pack 1GB or 2GB or nGB with the highest voltage is put into operation and connected to the intermediate DC link of the converter. At this time, the DUC controller or the locomotive microcomputer controls making of other power battery pack 1GB or 2GB or nGB circuit contactors 11KMDC and 12KMDC or 21KMDC and 22KMDC or n1KMDC and n2KMDC respectively, so that all power battery packs are put into operation and connected to the intermediate DC link of the converter. Due to provision of the chopper module 1, the chopper module 2 to the chopper module n, no return impulse current is formed between each power battery pack.

Control of output energy of the power battery system: When the locomotive is under the condition that energy is purely provided by the battery, the locomotive microcomputer transmits a command to the DUC controller through the communication network according to the power output of the locomotive required by the driver controller. The DUC controller controls the converter module DC/AC to output power to the traction motor. At this time, if the power battery packs have different voltages, the power battery pack 1GB or 2GB or nGB with the higher voltage outputs more electric energy. If the voltage of the intermediate DC circuit of the converter is higher than the voltage of the corresponding power battery pack 1GB or 2GB or nGB, the corresponding power battery pack 1GB or 2GB or nGB does not output energy. Only when the voltage of the intermediate DC circuit of the converter is lower than the voltage of the corresponding power battery pack 1GB or 2GB or nGB, the corresponding power battery pack outputs energy. With increase of operating time of the locomotive working time and output energy of the battery, the voltage of the power battery pack 1GB or 2GB or nGB with the highest voltage decreases continuously, so that the output power of the power battery pack with relatively low voltage increases continuously, and finally all power battery packs 1GB, 2GB and nGB have the same voltage.

Control of energy balance among the power battery packs: If a power battery pack 1GB or 2GB or nGB fails, the corresponding power battery pack is disconnected, and other power battery packs continue to work to ensure the normal operation of the locomotive. When the faulty power battery pack 1GB or 2GB or nGB is put into operation after maintenance, if voltage correlation among the power battery packs is large, the power battery management systems 1BMU, 2BMU and nBMU transmit the parameters of the power battery pack voltage sensors 1SV, 2SV and nSV and the position of the battery pack 1GB or 2GB or nGB with the highest voltage to the DUC controller through the communication network system. The DUC controller controls on-off of the battery switch 11T in the chopper module 1 or the battery switch 21T in the chopper module 2 or the battery switch niT in the chopper module n corresponding to the power battery pack 1GB or 2GB or nGB circuit with the lowest voltage, so that the power of the power battery pack 1GB or 2GB or nGB with the highest voltage is transmitted to the power battery pack 1GB or 2GB or nGB with the lowest voltage. Through such control method, the voltages of the power battery packs 1GB, 2GB and nGB are consistent, and the energy balance among the power battery packs is realized.

Control of hybrid energy of the diesel generator set and the power battery system: When the locomotive is under hybrid condition, the locomotive microcomputer controls the main generator excitation module according to a gear of the driver controller, controls the diesel generator set to output AC which is rectified by the converter module AC/DC, and outputs DC to the intermediate DC link of the converter. The power battery packs 1GB, 2GB and nGB are connected to the intermediate DC link of the converter through the chopper modules. When the output voltage of the diesel generator set is higher than the voltage of the power battery packs 1GB, 2GB and nGB, only the diesel generator set provides energy to the locomotive converter module DC/AC. If the power required to be output by the locomotive is greater than the power output by the diesel generator set, the output voltage of the diesel generator set decreases. When the voltage is the same as the highest voltage in the power battery pack 1GB, 2GB and nGB, the corresponding power battery pack and the diesel generator set jointly provide energy to the locomotive converter module DC/AC. If the power jointly provided by the power battery pack 1GB or 2GB or nGB with the highest voltage and the diesel generator set is still less than the power required for locomotive traction, the DC voltage from the intermediate DC link of the converter further reduces. In this way, more power battery packs are put into operation and output power together with the diesel generator set. With the increase of the locomotive traction power or extension of traction time, the DC voltage from the intermediate DC link of the converter further reduces, and finally all power battery packs are put into operation. After working for a period of time, the voltage of the power battery packs are basically the same.

Charging control of power battery: There are three ways to charge the power batteries, namely charging by the on-board diesel generator set, charging by the ground AC power supply and charging by recovered braking energy during locomotive braking. The AC power from the on-board diesel generator set is supplied to the converter module AC/DC through the switch 1 or the ground AC power supply through the switch 2, converted into DC power by the converter AC/DC, and output to the intermediate DC link of the converter. The power battery management systems 1BMU, 2BMU to nBMU transmit the parameters of the voltage sensors 1SV, 2SV and nSV, battery capacity parameters S0C1, S0C2 and S0Cn of the power battery packs, the maximum single voltage, maximum temperature and other parameters of each power batter pack to the DUC controller through the communication network. The DUC controller judges a maximum allowable charging current of each power battery pack according to the capacity, voltage, temperature and other parameters of the power battery packs to control the on-off of the corresponding chopper module so as to control the charging current of each power battery pack, so that the voltages of the power battery packs are the same. When the locomotive carries out braking force, the locomotive microcomputer receives a braking force command required by the driver controller and transmits the command to the DUC controller through the communication network. The DUC controller controls the DC/AC converter module to generate power from the traction motor. The AC power generated by the traction motor outputs the DC power to the intermediate DC link of the converter through the DC/AC converter module. The DUC controller controls the charging current according to the capacity, voltage and temperature of each power batter pack to ensure the total locomotive braking power.

Safety protection control of power battery packs: When the power battery management system 1BMU or 2BMU or nBMU detects abnormal battery voltage of a power battery pack, abnormal battery module temperature, or smoke in the battery compartment, the power battery management system 1BMU or 2BMU or nBMU outputs a control command to disconnect the contactors 11KMDC and 12KMDC or 21KMDC and 22KMDC or n1KMDC and n2KMDC, and cut off the corresponding power battery pack. If the locomotive microcomputer or the DUC controller detects that the locomotive load circuit is abnormal, the locomotive microcomputer or the DUC controller controls the contactors 11KMDC and 12KMDC, 21KMDC and 22KMDC, n1KMDC and n2KMDC to disconnect and cut off all power battery packs.

The topology structure of the present invention is shown in FIG. 2, and key technologies thereof are: first, the chopper module 1, chopper module 2 to chopper module n (note: in case of axle controlled AC drive locomotive, chopper module 1, chopper module 2 to chopper module n are chopper bridge arms in an axle controlled converter module); second, the filter reactors 1L, 2L to nL; third, the maintenance disconnectors 1QKA, 2QKA to 3QKA; fourth, the diodes 1VD, 2VD to nVD of each battery pack connected in parallel with the precharge return resistor R and the contactor KMDC1; fifth, the power battery pack total positive terminal fuses 11FU, 12FU to 1nFU and total negative terminal fuses 21FU, 22FU to 2nFU. The topology structure makes power battery pack put into operation in a simple and reliable manner.

The above mentioned embodiments are only preferred embodiments of the present invention and not used to limit the present invention. It should be noted that any modification, equivalent replacement and improvement made within the scope of the spirit and principle of the present invention shall be incorporated into the protection scope of the present invention.

The invention claimed is:

1. A power battery pack for a diesel-electric hybrid locomotive, comprising an AC/DC module, a DC/AC module, a power supply, a Digital Upconverter (DUC) controller, a locomotive microcomputer, a power battery management system, and an intermediate processing unit, wherein:
the intermediate processing unit comprises a chopper unit, a reactor unit and a power battery system, the chopper unit is connected in parallel to a support capacitor C, and is connected to the AC/DC module, the DC/AC module, the reactor unit and the power battery system;
the power battery system comprises a plurality of power modules, each power module comprises a contactor unit, a current sensor, a fuse, a power battery, and a voltage sensor, wherein the contactor unit, the current sensor and the power battery are connected in series to form a series circuit, the fuse is disposed on a series circuit, and a first end and a second end of the voltage sensor are connected to a first end and a second end of the power battery, respectively;
the DUC controller is connected to a locomotive microcomputer is connected to the DC/AC module, the chopper unit and the contactor unit, wherein the DUC controller is configured to receive a command signal from the locomotive microcomputer and to control the DC/AC module to output a power; and the power battery management system is connected to the contactor unit, wherein:
the plurality of power modules comprises a first power module to a nth power module;
the chopper unit comprises a first chopper subunit to a nth chopper subunit, each chopper subunit being correspondingly connected to one of the n power modules;
the power battery management system comprises a first battery management unit to a nth battery management unit (iBMU, i being 1 to n);
the contactor unit comprises a first contactor unit and a second contactor unit, the first contactor unit comprises contactors i1KMDC, the second contactor unit comprises contactors i2KMDC, iBMU is connected to i1KMDC and i2KMDC, respectively, i being 1 to n,
the reactor unit comprises a first filter reactor to a nth filter reactor, and each filter reactor is connected to one of i1KMDC,
and n being a positive integer of 2 or more;

wherein:
the power module is provided with a first current sensor and a second current sensor, the first current sensor is respectively connected to a first chopper subunit and a first filter reactor, the first filter reactor is connected to a first end of a first contactor, and a second end of the first contactor is connected to the second current sensor;
the second current sensor is connected to a first fuse, the first fuse is connected to the first power battery,
the first power battery is connected to a second fuse, and the second fuse is connected to the second contactor; and
for each power module, an outgoing line between the second current sensor and the contactor is connected to a positive pole of a diode, a negative pole of the diode is connected to a resistor, the resistor is connected to a contactor KMDC1, and the contactor KMDC1 is connected to a common node of a first filter reactor to a nth filter reactor.

2. The power battery pack according to claim 1, wherein the power supply comprises a diesel generator set and a ground AC power supply; the diesel generator set is connected to the AC/DC module through a first switch, and the ground AC power supply is connected to the AC/DC module through a second switch.

3. The power battery pack according to claim 1, further comprising a driver controller which is connected to the locomotive microcomputer.

4. The power battery pack according to claim 1, wherein each chopper subunit is a chopper module or a chopper bridge arm.

5. The power battery pack according to claim 4, wherein the chopper module comprises a first IGBT tube and a second IGBT tube in series, the first IGBT tube is connected in parallel to a first diode, and the second IGBT tube is connected in parallel to a second diode.

6. The power battery pack according to claim 1, further comprising a maintenance disconnector connected to the power module.

7. The power battery pack according to claim 6, wherein the maintenance disconnector comprises a first switch and a second switch, and the first switch and the second switch are respectively disposed at each end of the power module.

* * * * *